United States Patent
Hershberg et al.

(10) Patent No.: US 9,374,436 B2
(45) Date of Patent: *Jun. 21, 2016

(54) LOADING A RE-DIRECTED WEB PAGE ON A WEB BROWSER OF A CLIENT DEVICE IN A COMMUNICATIONS SYSTEM

(71) Applicant: QUALCOMM Incorporated, San Diego, CA (US)

(72) Inventors: Joshua Hershberg, Bet Shemesh (IL); Gabriel Berelejis, Mevaseret Zion (IL); Eitan Mizrotsky, Jerusalem (IL)

(73) Assignee: QUALCOMM Incorporated, San Diego, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/103,405

(22) Filed: Dec. 11, 2013

(65) Prior Publication Data

US 2014/0172945 A1    Jun. 19, 2014

Related U.S. Application Data

(60) Provisional application No. 61/736,981, filed on Dec. 13, 2012.

(51) Int. Cl.
  *G06F 15/16*    (2006.01)
  *H04L 29/08*    (2006.01)

(52) U.S. Cl.
  CPC ............ *H04L 67/2814* (2013.01); *H04L 67/02* (2013.01); *H04L 67/2871* (2013.01)

(58) Field of Classification Search
  CPC .................................................. H04L 67/2814
  USPC ......................................................... 709/202
  See application file for complete search history.

(56) References Cited

U.S. PATENT DOCUMENTS 6,865,605 B1 *   3/2005   Soderberg ............. H04L 67/327
                                                          707/E17.032
7,080,158 B1 *   7/2006   Squire .................. H04L 67/2814
                                                          370/389

(Continued)

FOREIGN PATENT DOCUMENTS

CN       101729328 B       4/2012
TW       201108780 A       3/2011

OTHER PUBLICATIONS

International Search Report and Written Opinion—PCT/US2013/074798—ISA/EPO—Mar. 6, 2014.

(Continued)

*Primary Examiner* — Larry Donaghue
*Assistant Examiner* — James Conaway
(74) *Attorney, Agent, or Firm* — Muncy, Geissler, Olds & Lowe, P.C.

(57) ABSTRACT

In an embodiment, a client device transmits a request for an initial web page to a proxy server. The proxy server requests the initial web page on behalf of the client device in response to the client device's request. The proxy server then executes a web page redirection procedure that is independent of interaction with the client device and results in the proxy server obtaining web page content. The proxy server delivers the web page content to a proxy client application on the client device along with instructions for simulating, on the client device, the web page redirection procedure between the proxy client application and a mobile web browser on the client device. The proxy client application on the client device then simulates the web page redirection procedure that occurred at the proxy server as instructed.

18 Claims, 12 Drawing Sheets

(56) References Cited

U.S. PATENT DOCUMENTS

| | | | |
|---|---|---|---|
| 7,099,915 B1 | 8/2006 | Tenereillo et al. | |
| 7,647,424 B2 | 1/2010 | Kim et al. | |
| 7,873,707 B1* | 1/2011 | Subramanian | G06F 17/30887 709/219 |
| 2002/0007393 A1 | 1/2002 | Hamel et al. | |
| 2002/0059371 A1 | 5/2002 | Jamail et al. | |
| 2002/0116411 A1* | 8/2002 | Peters | G06F 17/30884 715/234 |
| 2003/0182357 A1* | 9/2003 | Chess | G06F 17/30902 709/203 |
| 2003/0182424 A1 | 9/2003 | Odendahl | |
| 2004/0107261 A1* | 6/2004 | Donzis | H04L 45/742 709/207 |
| 2005/0010662 A1 | 1/2005 | Prabhakar et al. | |
| 2005/0060410 A1 | 3/2005 | Wu et al. | |
| 2008/0172488 A1 | 7/2008 | Jawahar et al. | |
| 2010/0011121 A1 | 1/2010 | Van et al. | |
| 2010/0024032 A1* | 1/2010 | Britton | G06Q 30/02 726/22 |
| 2012/0066586 A1* | 3/2012 | Shemesh | G06F 17/30902 715/235 |
| 2012/0102221 A1* | 4/2012 | Grieve | G06F 17/30887 709/238 |
| 2012/0117253 A1 | 5/2012 | Scoda | |
| 2012/0117270 A1 | 5/2012 | Scoda | |
| 2012/0176968 A1* | 7/2012 | Luna | H04W 12/06 370/328 |
| 2013/0122821 A1* | 5/2013 | Yeung | H04L 67/2819 455/67.11 |
| 2013/0173693 A1* | 7/2013 | Arsenault | H04L 67/2814 709/203 |
| 2014/0172946 A1 | 6/2014 | Hershberg et al. | |
| 2015/0207660 A1* | 7/2015 | Sundaram | H04L 29/06047 709/203 |
| 2015/0271046 A1* | 9/2015 | Clubb | H04L 43/10 709/203 |

OTHER PUBLICATIONS

Taiwan Search Report—TW102146247—TIPO—Mar. 10, 2015.

* cited by examiner

LOADING A RE-DIRECTED WEB PAGE ON A WEB BROWSER OF A CLIENT DEVICE IN A COMMUNICATIONS SYSTEM

CLAIM OF PRIORITY UNDER 35 U.S.C. §119

The present Application for Patent claims priority to Provisional Application No. 61/736,981, entitled "LOADING A RE-DIRECTED WEB PAGE ON A WEB BROWSER OF A CLIENT DEVICE IN A COMMUNICATIONS SYSTEM", filed Dec. 13, 2012, by the same inventors as the subject application, assigned to the assignee hereof and hereby expressly incorporated by reference herein in its entirety.

BACKGROUND OF THE INVENTION

1. Field of the Invention

Embodiments of the invention relate to loading a re-directed web page on a web browser of a client device in a communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., mobile devices such as cell phones) that use the above-noted communication systems or other types of access networks (e.g., WiFi, etc.) to execute web browsing applications that load web pages from one or more web servers via the Internet. An initial loading of a web page will typically require processing at a given client device as well as the web server providing the web page before the web page can be loaded on the given client device (e.g., DNS resolution, web-page redirection, etc.). In the case of web-page redirection, the given client device will typically request an initial web page from the web server, receive a re-direct command from the web-server, and then subsequently request another web page based on the re-direct command. This web page re-direction procedure delays the loading of the web page, and also consumes additional resources because two separate requests are issued for the web page (i.e., the initial request and then the re-direct request).

SUMMARY

In an embodiment, a client device transmits a request for an initial web page to a proxy server. The proxy server requests the initial web page on behalf of the client device in response to the client device's request. The proxy server then executes a web page redirection procedure that is independent of interaction with the client device and results in the proxy server obtaining web page content. The proxy server delivers the web page content to a proxy client application on the client device along with instructions for simulating, on the client device, the web page redirection procedure between the proxy client application and a mobile web browser on the client device. The proxy client application on the client device then simulates the web page redirection procedure that occurred at the proxy server as instructed.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
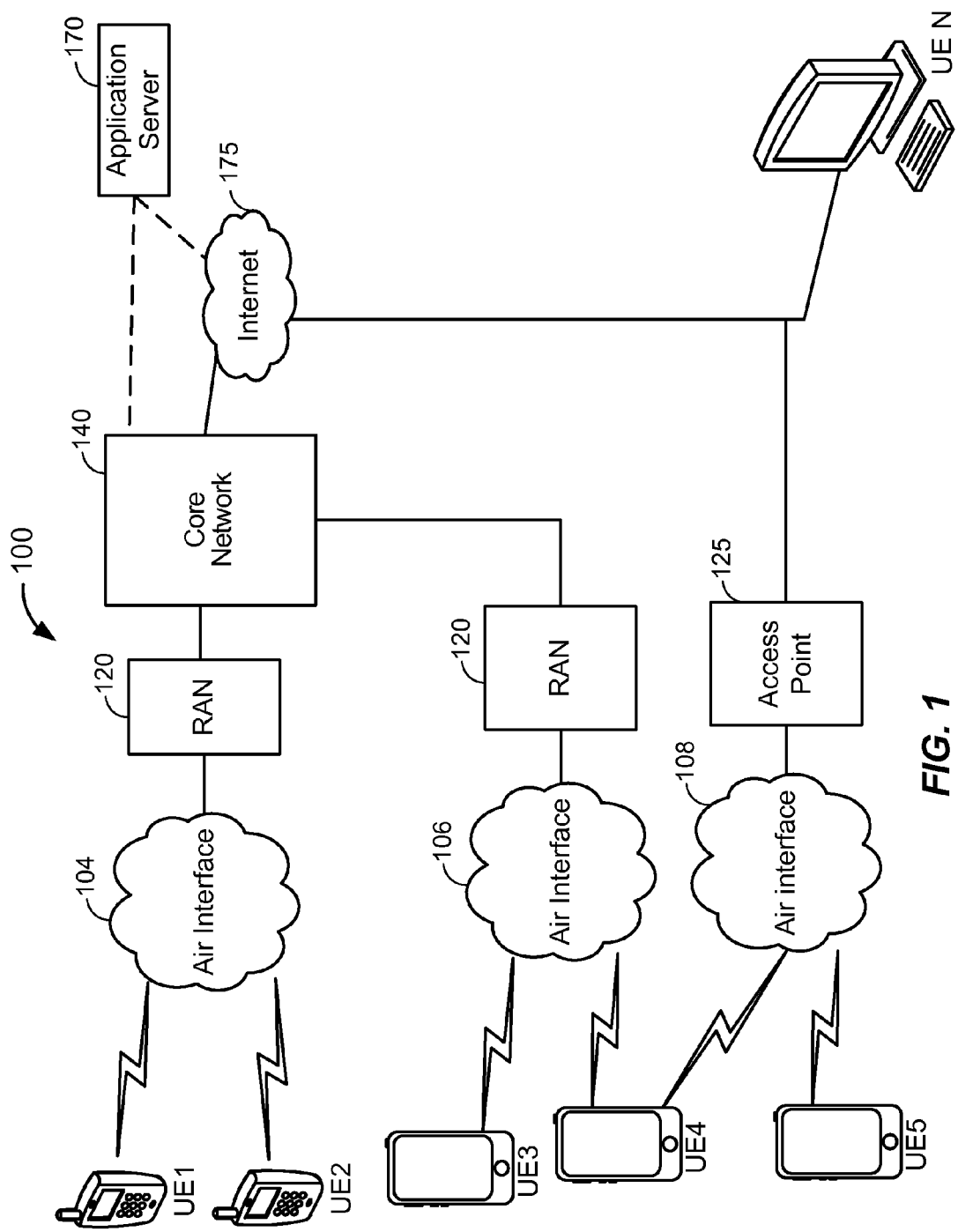
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touch-screen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2A:
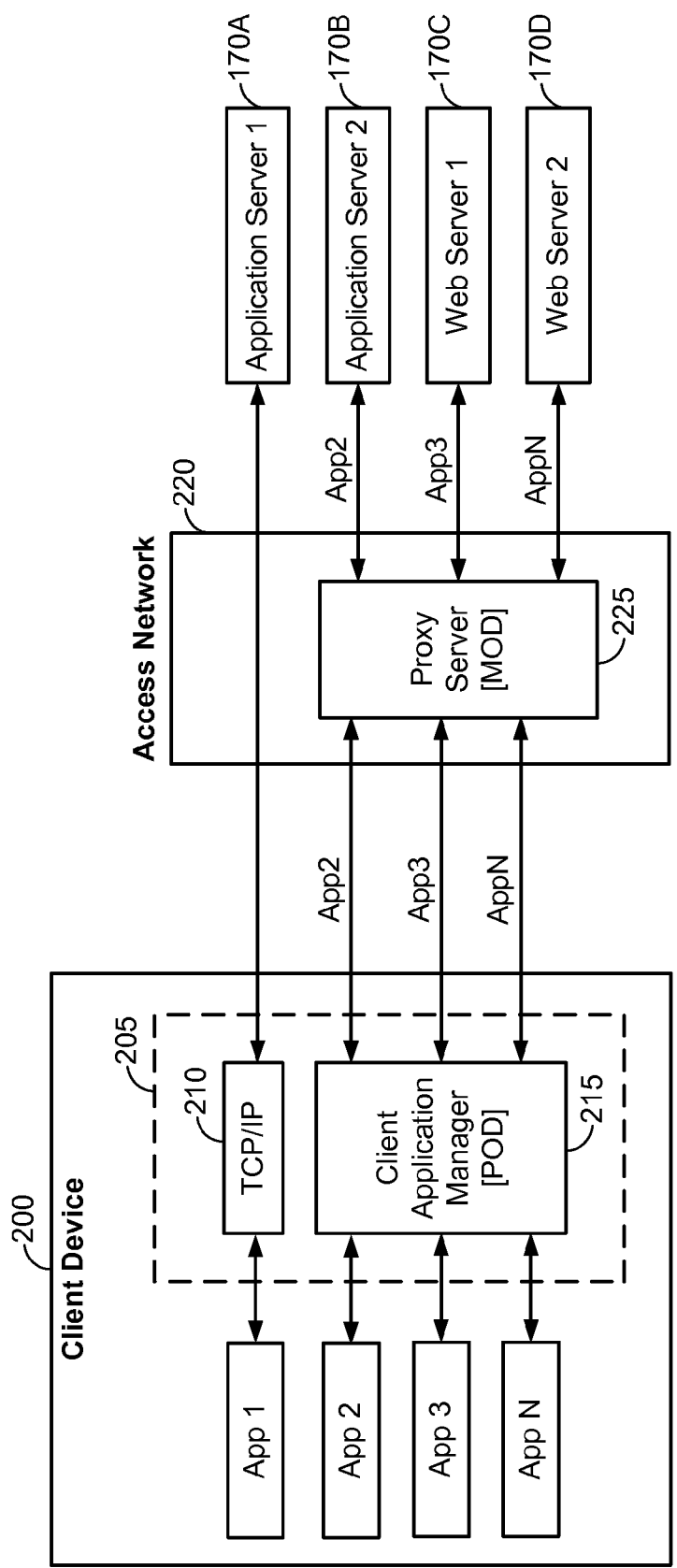
FIG. 2A illustrates a client-server architecture in accordance with an embodiment of the present invention.

FIG. 2A illustrates a client-server architecture in accordance with an embodiment of the present invention. Referring to FIG. 2A, a client device 200 (e.g., a UE) includes a plurality of mobile applications 1 . . . N and a transport layer 205. The transport layer 205 is configured to convert data from mobile applications 1 . . . N into packets for transmission to an access network 220 (e.g., the RAN 120, the AP 125, etc.) and/or to receive packets from the access network 220 for delivery to higher-layers, such as one of the mobile applications 1 . . . N. The transport layer 205 includes a conventional Transmission Control Protocol (TCP)/Internet Protocol (IP) layer or stack 210. As is known in the art, data can be forwarded by any of the mobile applications 1 . . . N to the TCP/IP stack 210 and then converted into data packets which are queued for transmission to specified target servers (e.g., a Facebook server, a Netflix server, etc.) by the client device 200, and incoming data packets at the client device 200 can be processed at the TCP/IP stack 210 for delivery to higher-layers, such as one of the mobile applications 1 . . . N. The transport layer 205 further includes a client application manager application 215, which is referred to hereinafter as a proxy on device (POD) 215. As will be described below in more detail, the POD 215 is configured to interface with one or more of the mobile applications 1 . . . N including at least a mobile web browsing application. One of the functions of the POD 215 is to execute specialized re-direct handling procedures on behalf of the mobile web browsing application via coordination with an external proxy server 225, which is referred to hereinafter as a Mobile Optimized Data (MOD) server 225.

In FIG. 2A, the POD 215 does not necessarily interact with each mobile application resident on the client device 200 and/or with each instance of network access for the mobile applications 1 ... N. Thereby, FIG. 2A illustrates an example whereby a data exchanged between the client device 200 and the access network 220 for application 1 is handled by the TCP/IP stack 210, while data exchanged between the client device and the access network 220 (e.g., transmissions of web page requests, receptions of re-direct commands for web pages, etc.) for applications 2 ... N are handled by the POD 215 instead of the TCP/IP stack 210.

Further illustrated in FIG. 2A is the access network 220, which may correspond to the RAN 120, the AP 125, a wired Ethernet router or modem (not shown), etc. While the structural components (e.g., Node Bs, etc.) of the access network 220 are not illustrated in FIG. 2A in detail, the access network 220 is shown as including the MOD 225. The access network 220 is in turn connected to the Internet 175, where a variety of servers can be accessed, such as application servers 170A-170B and web servers 170C-170D. The MOD 225 can be implemented at different network locations of the access network 220, including but not limited to a serving Node B (or base station or eNodeB) of the client device 200, an RNC (or BSC), and so on. As will be explained in greater detail below, the MOD 225 is responsible for interfacing with the POD 215 on the client device 200 and exchanging data packets with the client device 200 on behalf of one or more mobile applications executing thereon. The MOD 220 can also perform operations associated with web page re-directs on behalf of a mobile web browsing application on the client device 200, such as responding to a re-direct command from a target web server without forwarding the re-direct commands back to the client device 200 that issued the request for the initial web page (prior to re-direct). From the perspective of both the mobile web browsing application executing on the client device 200 and the target web servers that provide the web page content, the operations of the POD 215 and MOD 225 are transparent, such that any specialized MOD-POD procedures do not necessarily require modification to the standard operation of the mobile web browsing application and/or the target web servers.

Figure 2B:
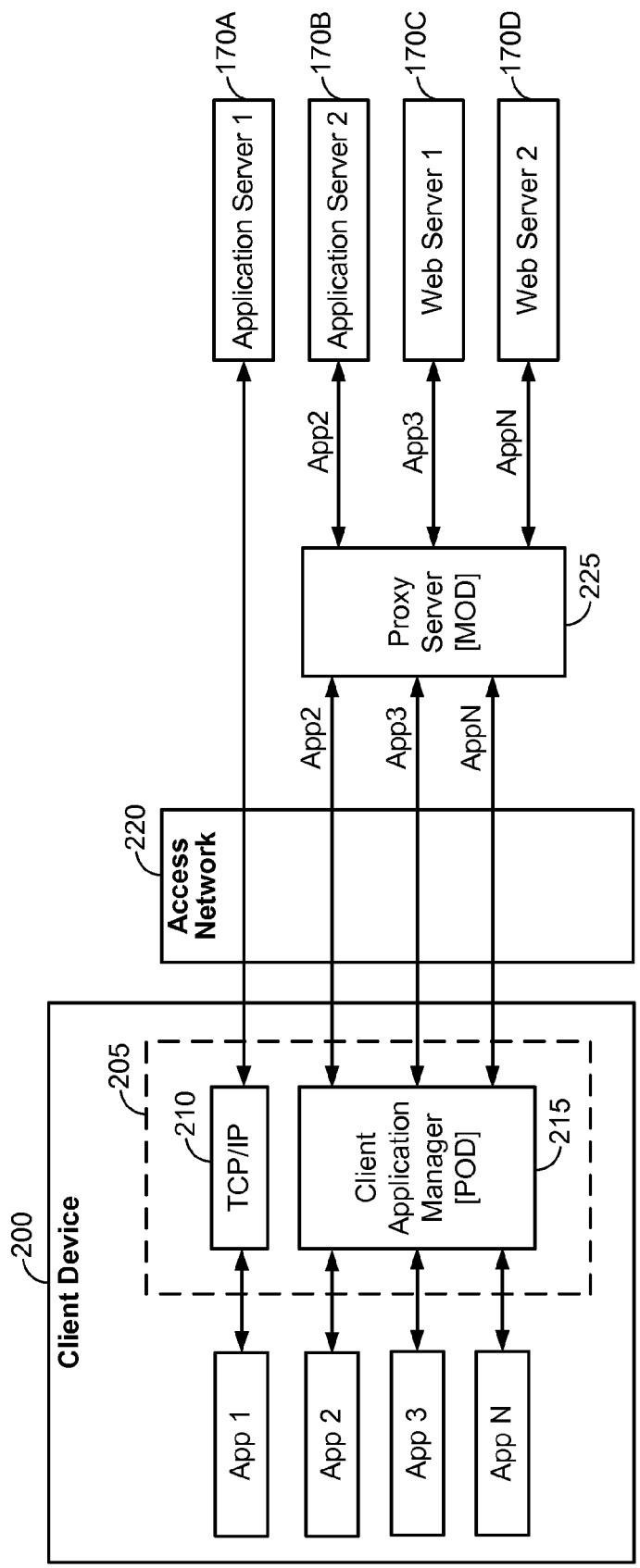
FIG. 2B illustrates a client-server architecture in accordance with another embodiment of the present invention.

FIG. 2B illustrates a client-server architecture in accordance with another embodiment of the present invention. FIG. 2B is similar to FIG. 2A, except that the MOD 225 is positioned outside of the access network 220, for example, as an Internet destination reachable via the Internet 175. FIG. 2B is otherwise similar to FIG. 2A and will not be described further for the sake of brevity.

Figure 3:
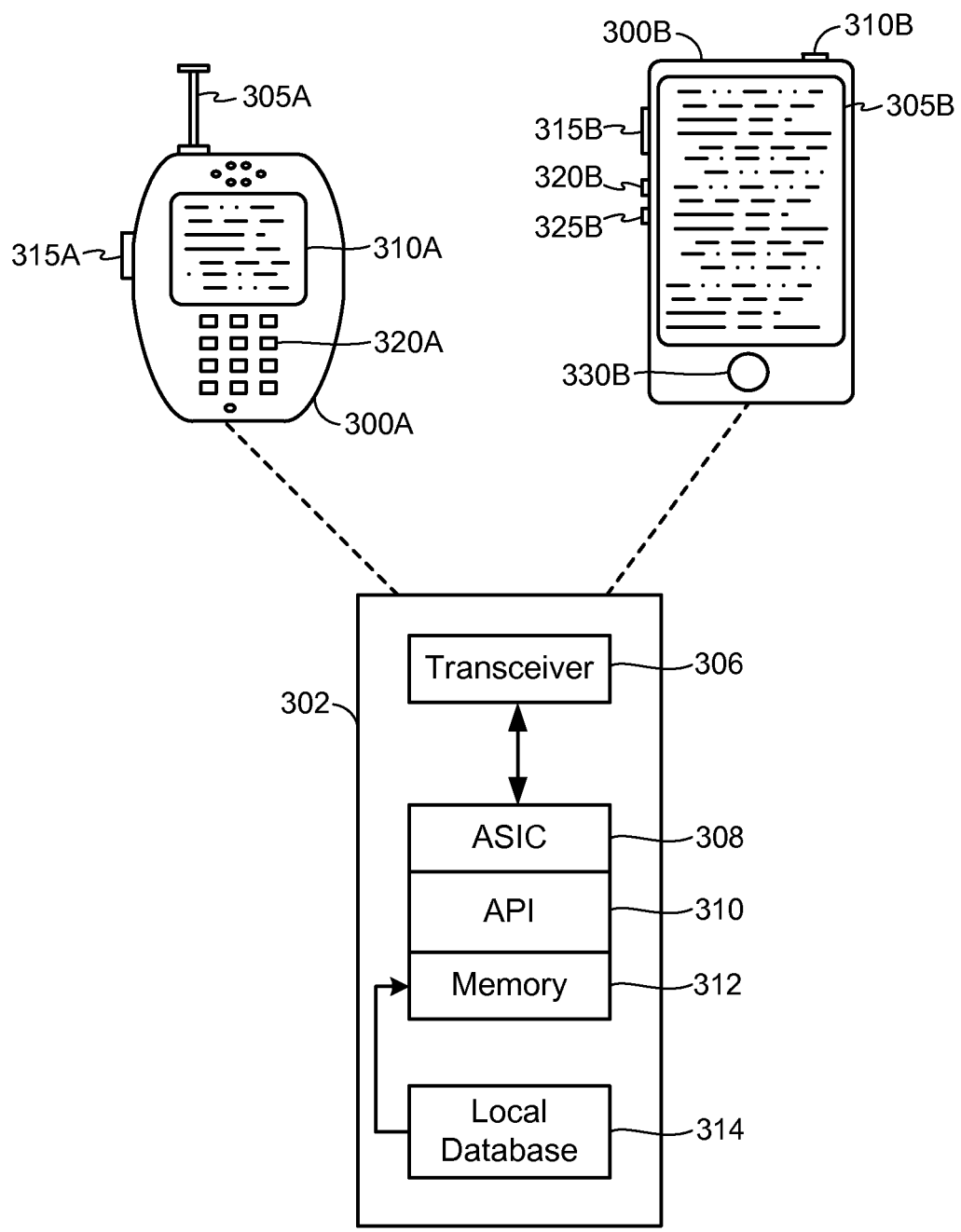
FIG. 3 illustrates examples of user equipments (UEs) in accordance with embodiments of the invention.

FIG. 3 illustrates examples of UEs (i.e., client devices) in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
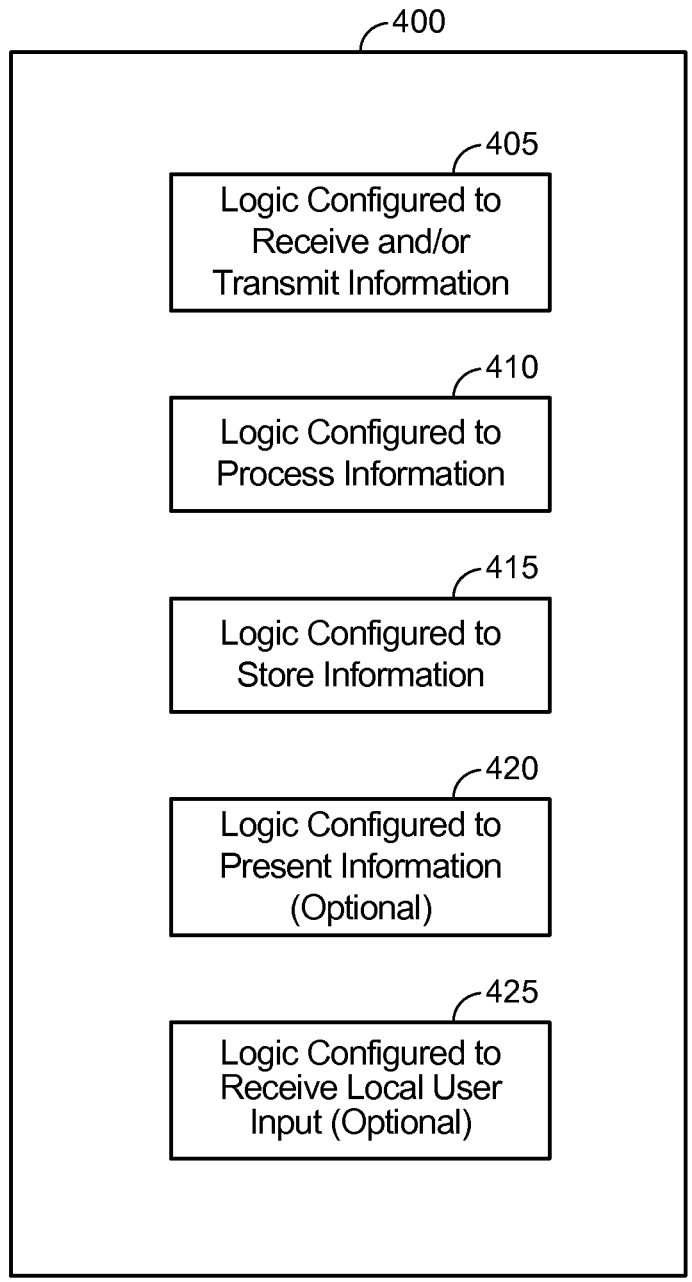
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
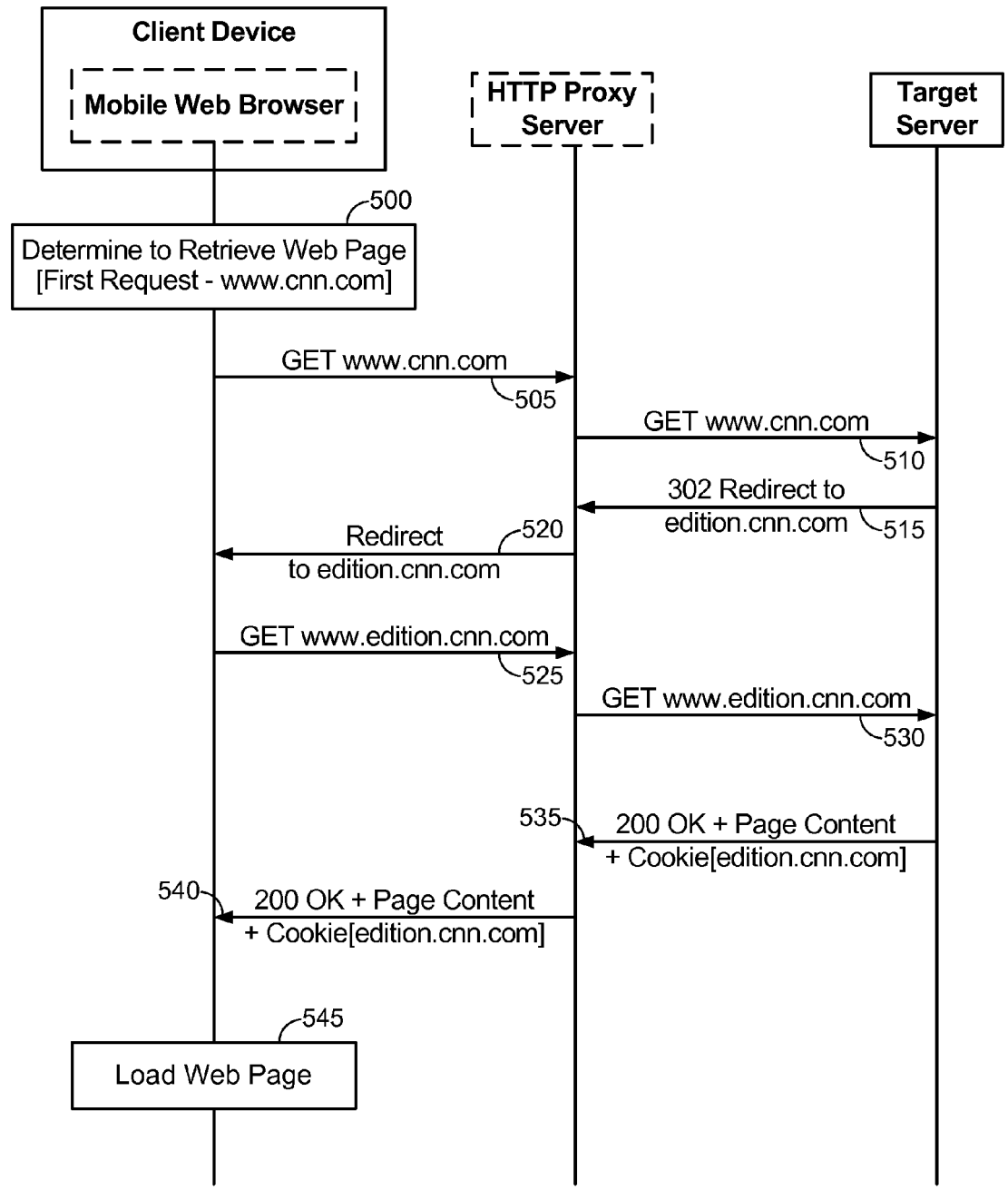
FIG. 5 illustrates a conventional process of loading a web page via a mobile web browser on a client device.

FIG. 5 illustrates a conventional process of loading a web page via a mobile web browser on a client device. Referring to FIG. 5, the mobile web browser determines to retrieve a given web page at 500. For convenience of explanation, FIG. 5 is illustrated such that an HTTP proxy server is mediating interaction between the client device and a target server hosting the given web page, and the given web page is illustrated in FIG. 5 as corresponding to www.cnn.com (or cnn.com). However, it will be appreciated that other conventional web page loading procedures can bypass the HTTP proxy server altogether, and can be directed to loading any other web page. In FIG. 5, assume that the mobile web browser has no special knowledge of any re-directs for the given web page at 500 (e.g., re-directs are generally deemed to be temporary and conventional mobile web browsers will not typically cache re-direct information for re-use). The mobile web browser transmits a request for the given web page to a HTTP proxy server, 505, and the HTTP proxy server forwards the request for the given web page to a target server associated with the given web page, 510. The target server responds to the request with a 302 redirect to an alternate web page, 515, such as a mobile version of the given web page (e.g., www.edition-.cnn.com or edition.cnn). It will be appreciated that the "302" in the 302 redirect is merely redirect response code example. Generally, the description below re-uses 302 as the response code for consistency, but it will be readily understood that other response codes could also be used for any of the redirects described herein. In response to the 302 redirect from the target server, the HTTP proxy server issues a new request for the alternate web page to the mobile web browser on the client device, 520. In response to the redirect message, the mobile web browser transmits a request for the alternate web page to the HTTP proxy server, 525, and the HTTP proxy server forwards the request for the alternate web page to the target server associated with the alternate web page, 530. In FIG. 5, the target server associated with the given web page and the alternate web page is shown as the same server, but the respective web pages could alternatively be hosted by different servers. The target server responds to the request for the alternate web page with a 200 OK message, the requested content for the alternate web page, and a cookie for the alternate web page, 535 (e.g., Cookie[edition.cnn.com], for the web page www.edition.cnn.com). The HTTP proxy server forwards the 200 OK message, the requested content for the alternate web page, and the cookie for the alternate web page to the mobile web browser on the client device, 540, and the mobile web browser loads the alternate web page using the page content and caches the cookie for the alternate web page for future attempts for loading the alternate web page, 545.

As will be appreciated, it is relatively inefficient for the redirect message to be pushed back to the mobile web browser on the client device so that the mobile web browser can initiate another separate attempt to load the alternate web page. However, problems can result if the HTTP proxy server simply attempts to respond to the 302 redirect message itself without involving the mobile web browser on the client device, as will be described with respect to FIG. 6.

Referring to FIG. 6, 600 through 615 correspond to 500 through 515 and will not be described further for the sake of brevity. At 620, instead of sending a redirect message back to the mobile web browser on the client device as in 520 of FIG. 5, the HTTP proxy server instead requests the alternate web page itself. Accordingly, the target server responds to the HTTP proxy server's request for the alternate web page with a 200 OK message, the requested content for the alternate web page, and a cookie for the alternate web page, 625 (e.g., Cookie[edition.cnn.com], for the web page www.edition.cnn.com). The HTTP proxy server forwards the 200 OK message, the requested content for the alternate web page, and the cookie for the alternate web page to the mobile web browser on the client device, 630.

Figure 6:
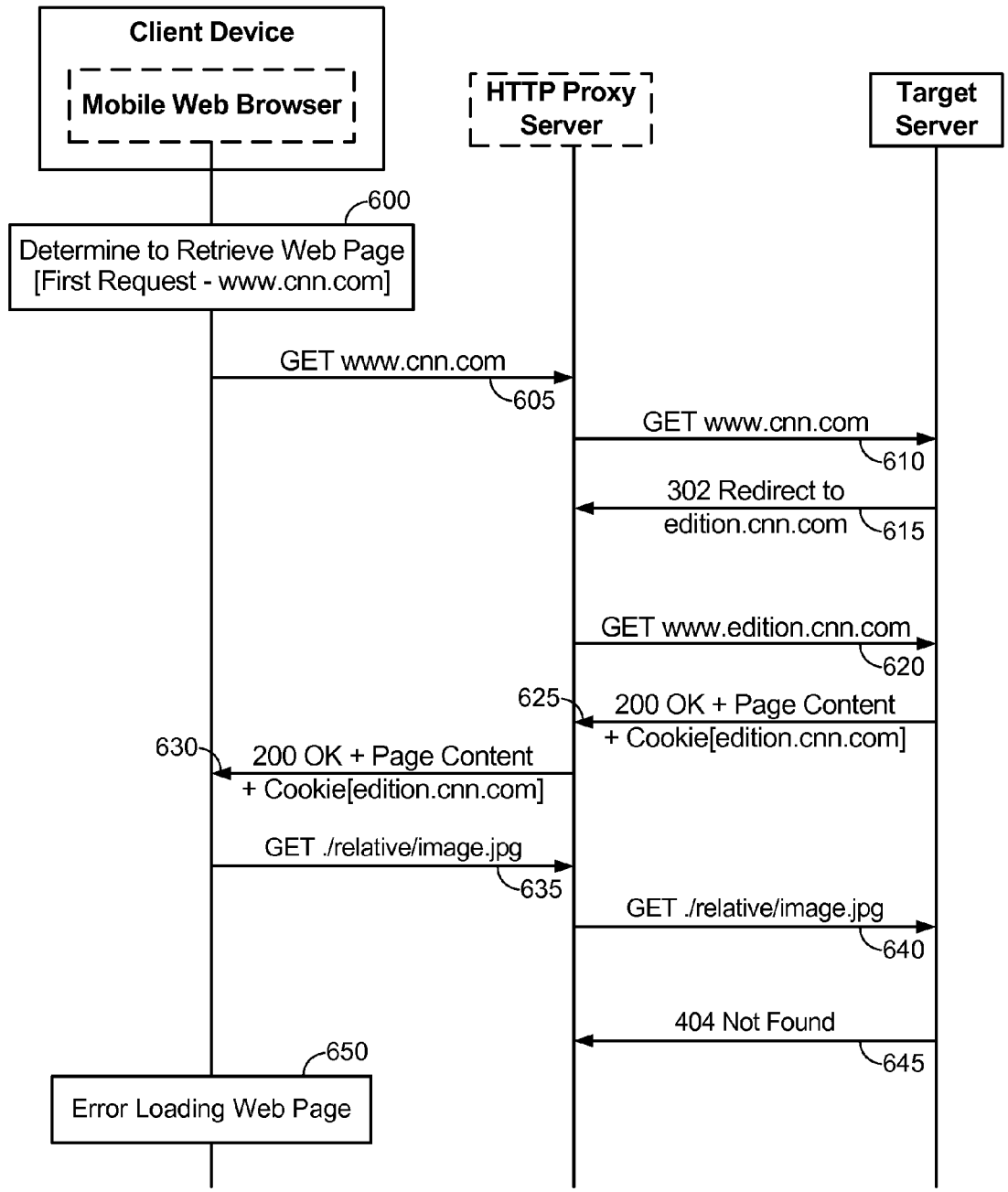
FIG. 6 illustrates a conventional process of loading a web page via the mobile browser on the client device where an HTTP proxy server returns a redirect web page to the mobile device instead of a requested web page.

However, as will be appreciated by one of ordinary skill in the art, many web resources, including HTML pages, require that the mobile web browser know the exact URL from which the resource was downloaded. One reason for this is so that the mobile web browser can accurately download relative URLs of embedded resources. In FIG. 6, the mobile web browser asked for the given web page at 605 (e.g., www.cnn.com), but the mobile web browser received content for a different web page at 630 (e.g., www.edition.cnn.com). Thus, the mobile web browser is fooled into thinking that it is loading content for www.cnn.com when the mobile web browser is actually loading content for www.edition.cnn.com. For this reason, while the alternate web page is being loaded, the mobile web browser may issue requests for relative URLs of embedded resources at 635, and the HTTP proxy server forwards the relative resource request to the target server for the given web page, 640. However, the resource is relative to the alternate web page (not the given web page), such that the target server returns a 404 Not Found error message, 645. For this reason, the mobile web browser will be unable to load the relative resource on its display of the alternate web page, 650.

Figure 7:
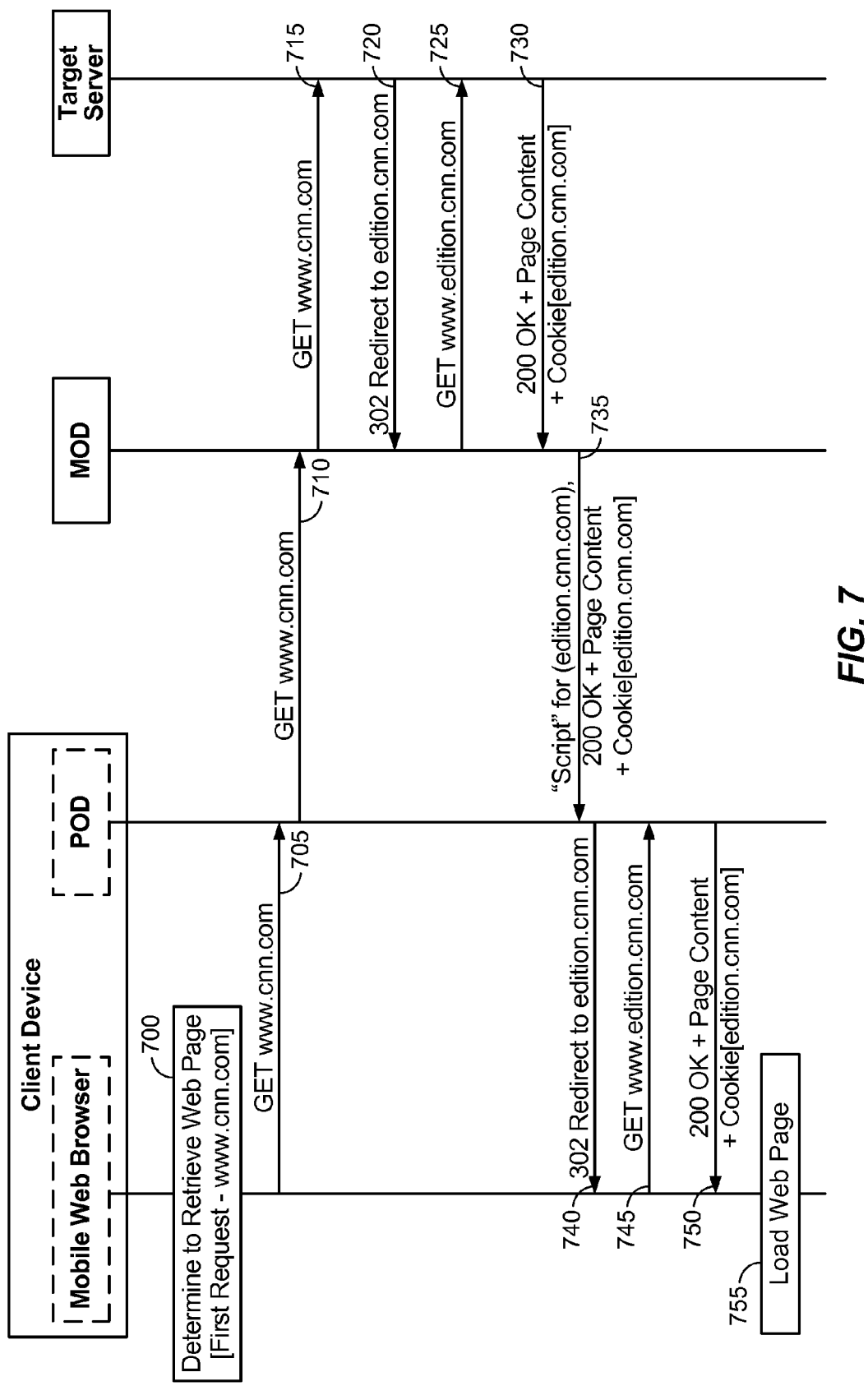
FIG. 7 illustrates a proxy redirect procedure in accordance with an embodiment of the invention.

FIG. 7 illustrates a MOD-POD implementation of a proxy (or MOD) redirect in accordance with an embodiment of the invention. Unlike FIG. 6, the MOD can implement the redirect on behalf the client device via coordination with the POD in a manner that will not result in relative resource loading problems for the alternate (or re-directed) web page.

Referring to FIG. 7, assume that the client device is implemented as shown in FIGS. 2A or 2B with respect to the client device 200, such that the client device is provisioned with the POD 215, and that the POD 215 is configured to communicated with the MOD 225. At 700, the mobile web browser determines to retrieve a given web page. Similar to FIGS. 5-6, for convenience of explanation, the given web page is illustrated in FIG. 7 as corresponding to www.cnn.com. At 700 in FIG. 7, assume that the given web page has not been requested earlier by the mobile web browser, or at least not since the mobile web browser's cache has been cleared. Thus, the mobile web browser has no special knowledge of any redirects or cookies for the given web page at 700. The mobile web browser attempts to transmit a request for the given web page to an associated target server or HTTP proxy server, 705, but the POD 215 intercepts the attempted request and transmits the request to the MOD 225, 710. The MOD 225 forwards the request for the given web page to the target server associated with the given web page, 715. The target server responds to the request with a 302 redirect to an alternate web page, 720, such as a mobile version of the given web page (e.g., www.edition.cnn.com).

At 725, instead of sending a redirect message back to the mobile web browser on the client device as in 520 of FIG. 5, the MOD 225 instead requests the alternate web page itself Accordingly, the target server responds to the MOD's request for the alternate web page with a 200 OK message, and the requested content for the alternate web page, 730.

At 630 of FIG. 6, the HTTP proxy server simply forwarded the re-directed content to the mobile web browser as if it was providing content for the initially requested web page, which resulted in errors when loading the web page at the mobile web browser. Accordingly, the MOD 225 forwards the 200 OK message and the requested content for the alternate web page to the POD 215 along with a set of instructions (or a "Script") for mimicking the 302 redirect procedure for the alternate web page on the client device, 735. Thus, instead of presenting the redirected content to the mobile web browser as if it were the initially requested content, the MOD 225 asks the POD 215 to recreate (or mimic) the redirect procedure from 720-730 on the client device with the mobile web browser. An example of the type of script that may be provided at 735 is as follows:

HTTP/1.1 200 OK
Server: nginx/1.2.1
Date: Sun, 8 Jul. 2012 14:12:53 GMT
Content-Length: 21442
Connection: close
Content-Type: application/MOD-WebScript
IskNextResponse: http://www.cnn.com/
HTTP/1.1 302 Moved Temporarily
Server:nginx
Date:Sun, 8 Jul. 2012 14:12:58 GMT
Set-Cookie:CG=IL:--:--; path=/
Cache-Control:private, no-cache
Vary:*
Location:http://edition.cnn.com/
IskNextResponse:http://edition.cnn.com/
HTTP/1.1 200 OK
Server:nginx
Date:Sun, 8 Jul. 2012 14:12:58 GMT
Content-Type:text/html; charset=UTF-8
IskContenType:text/html; charset=UTF-8
Connection:keep-alive
Set-Cookie:CG=IL:--:--; path=/
Cache-Control:max-age=60, private
Vary:Accept-Encoding, User-Agent
X-UA-Profile:desktop
Content-Length:20798

Referring to FIG. 7, the POD 215 receives the transmission of 735 and implements the "spoofed" redirect procedure by sending a 302 redirect message for the alternate web page to the mobile web browser, 740, which prompts the mobile web browser to respond with a request for the alternate web page, 745, the request for the alternate web page is intercepted by the POD 215 and the POD 215 responds to the request with the 200 OK message, and the requested content for the alternate web page, 750. At this point, the mobile web browser loads the web page with the understanding that it has been redirected to the alternate web page, 755, such that the loading errors from FIG. 6 do not occur.

Figure 8:
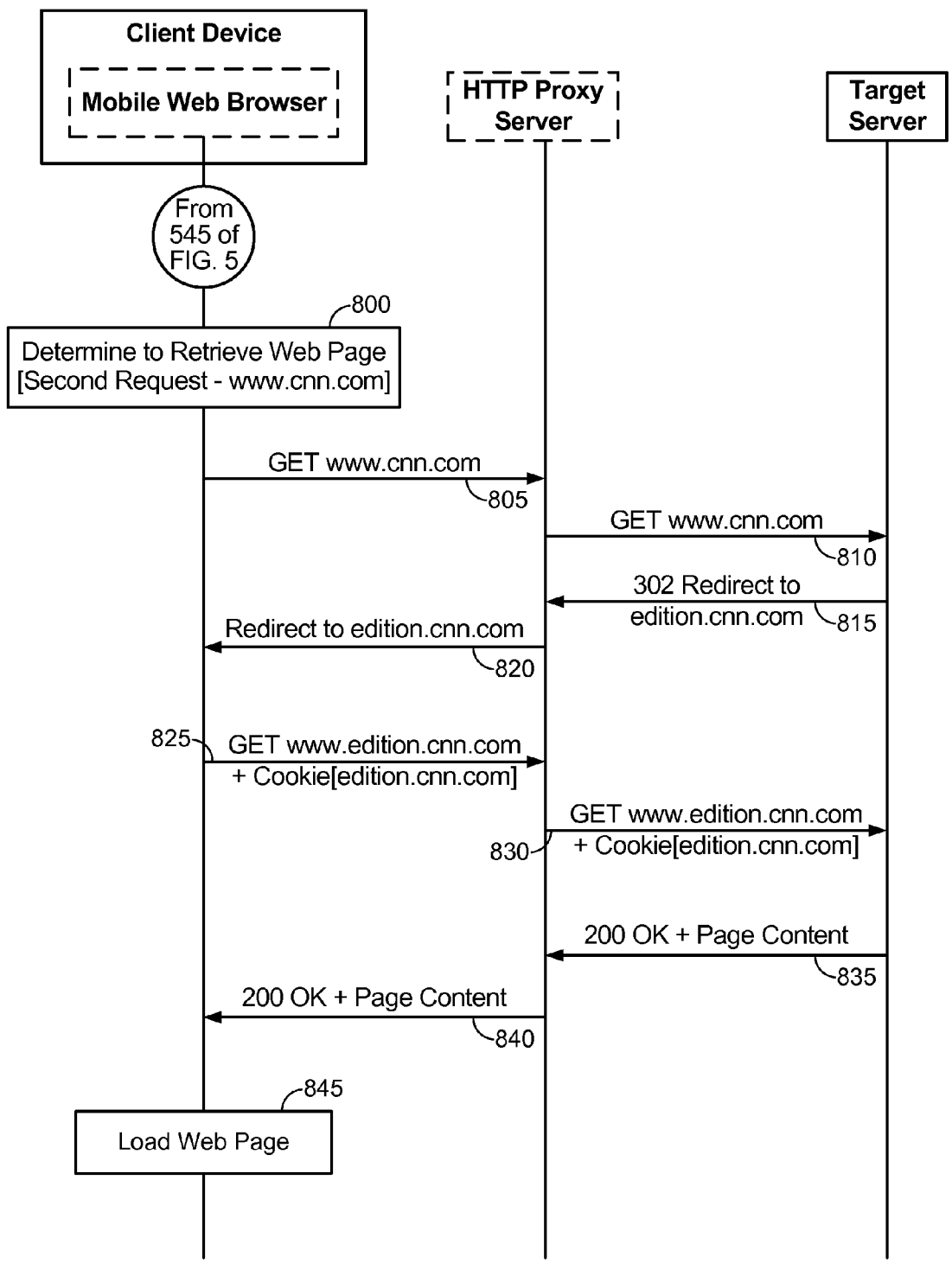
FIG. 8 illustrates a continuation of the process of FIG. 5 during a process of loading the web page for a second time.

Another reason that outsourcing the redirect procedure from the client device itself to a proxy server such as the HTTP proxy server from FIG. 6 can be difficult to implement relates to cookie management. Web servers typically provide cookies for a web page to a new requestor of that web page with the 200 OK message and page content (e.g., at 535 of FIG. 5, 625 of FIG. 6, 730 of FIG. 7, and so on), as shown in FIG. 8. To provide context for FIGS. 8-11, it should be appreciated that under conventional cookie management protocols, cookies are scoped to a specific domain that originated the cookies, and web browsers receiving the cookies send exclusively to their respective originating servers.

FIG. 8 illustrates a continuation of the process of FIG. 5 during a process of loading the given web page for a second time. FIG. 8 is similar to FIG. 5, except that unlike the request for the alternate web page 525 and 530 of FIG. 5, the request sent at 825 and 830 includes the cookie for the alternate web page (e.g., Cookie[edition.cnn.com]) that was obtained by the mobile web browser at 540 and cached at 545. By providing the cookie to the target server at 830, the target server is able to identify the mobile web browser as a repeat visit to the alternate web site and can load user-specific settings (e.g., such as the appropriate language for content, etc.)

However, in a system where the proxy server handles redirects on behalf of the client device, such as in FIG. 6 or FIG. 7, the proxy server will be handling the re-direct procedure and the proxy server does not necessarily know the cookie for the alternate web page. For example, even though the HTTP proxy server forwards the 200 OK message and page content to the mobile web browser at 630 of FIG. 6, the HTTP proxy server does not cache the associated cookie for the alternate web page itself and thereby cannot use this cookie the next time that the HTTP proxy server attempts to load the alternate web page on behalf of the mobile web browser.

Figure 9:
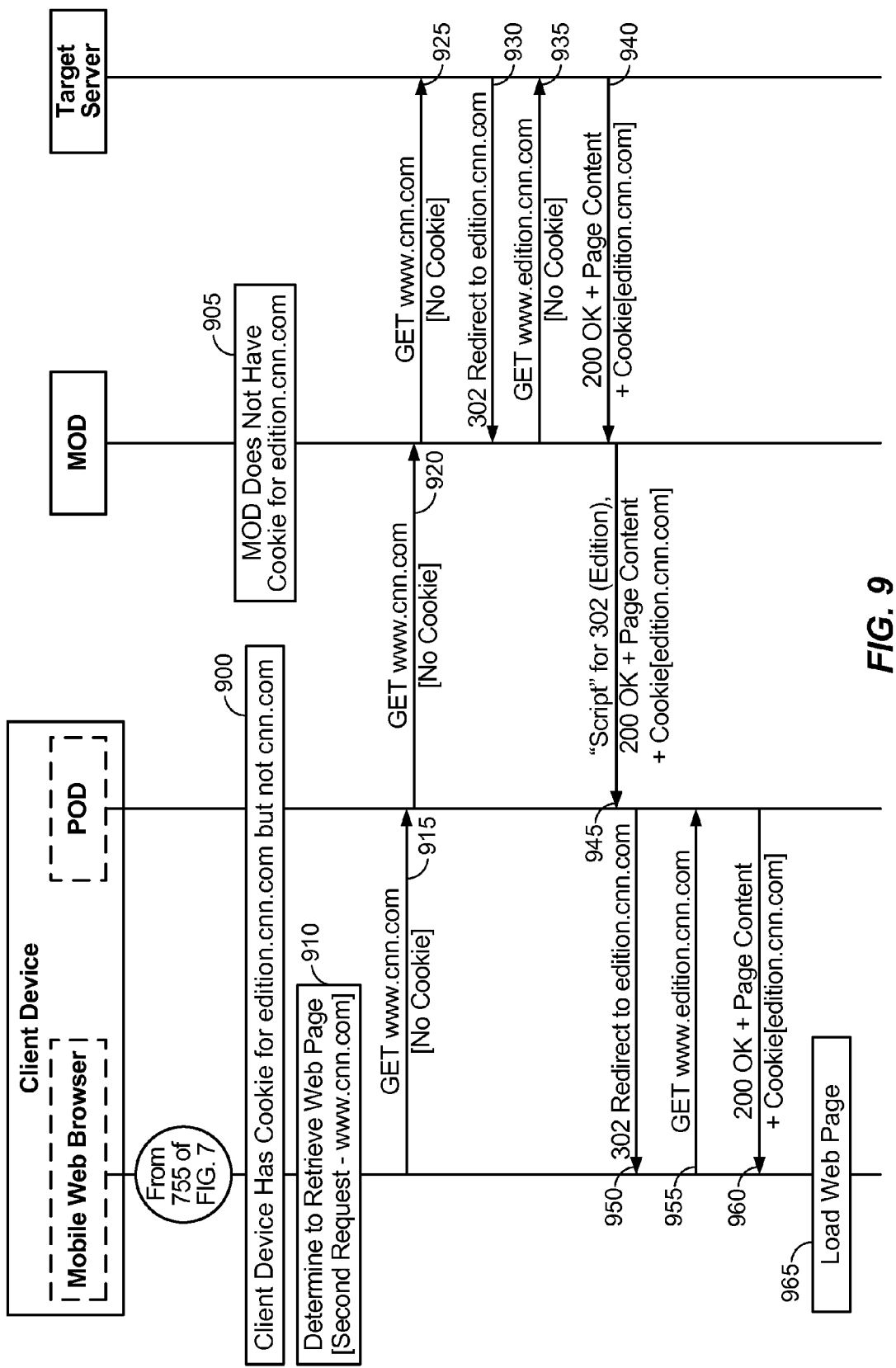
FIG. 9 illustrates a continuation of the process of FIG. 7 in accordance with an embodiment of the invention.

To explain the potential problems that can arise from this scenario, FIG. 9 is described below as a continuation of FIG.

7 under the assumption that FIG. 7 executes without the MOD 225 maintaining a record of any cookies exchanged during the process of FIG. 7.

Referring to FIG. 9, after 755 of FIG. 7, assume that the mobile web browser on the client device has a cookie for the alternate web page (e.g., Cookie[edition.cnn.com] but not the given web page (due to the re-direct), 900, and that the MOD 225 did not maintain a record of any cookies exchanged during the process of FIG. 7, 905. With these assumptions, if the mobile web browser determines to request the given web page again, 910, the mobile browser attempts to request the given web page at 915 but does not provide a cookie for the given web page in its request (because it is not available) and will also not provide a cookie for the alternate web page in its request (because the alternate web page is not being requested yet). The POD 215 intercepts the attempted request and transmits the request to the MOD 225, 920, but the transmitted request also includes no cookies for the same reason as discussed above with respect to 915. The MOD 225 forwards the request for the given web page to the target server associated with the given web page, 925. The target server responds to the request with a 302 redirect to an alternate web page, 930, such as a mobile version of the given web page (e.g., www.edition.cnn.com). At this point, the MOD 225 does not know the cookie for the alternate web page (e.g., see 905) even though the mobile web browser on the client device has it cached. Thus, 935 through 965 substantially correspond to 725 through 755, such that the target server provides the page content without knowledge of the cookie of the client device from the previous time the alternate web page was loaded at FIG. 7.

Figure 10:
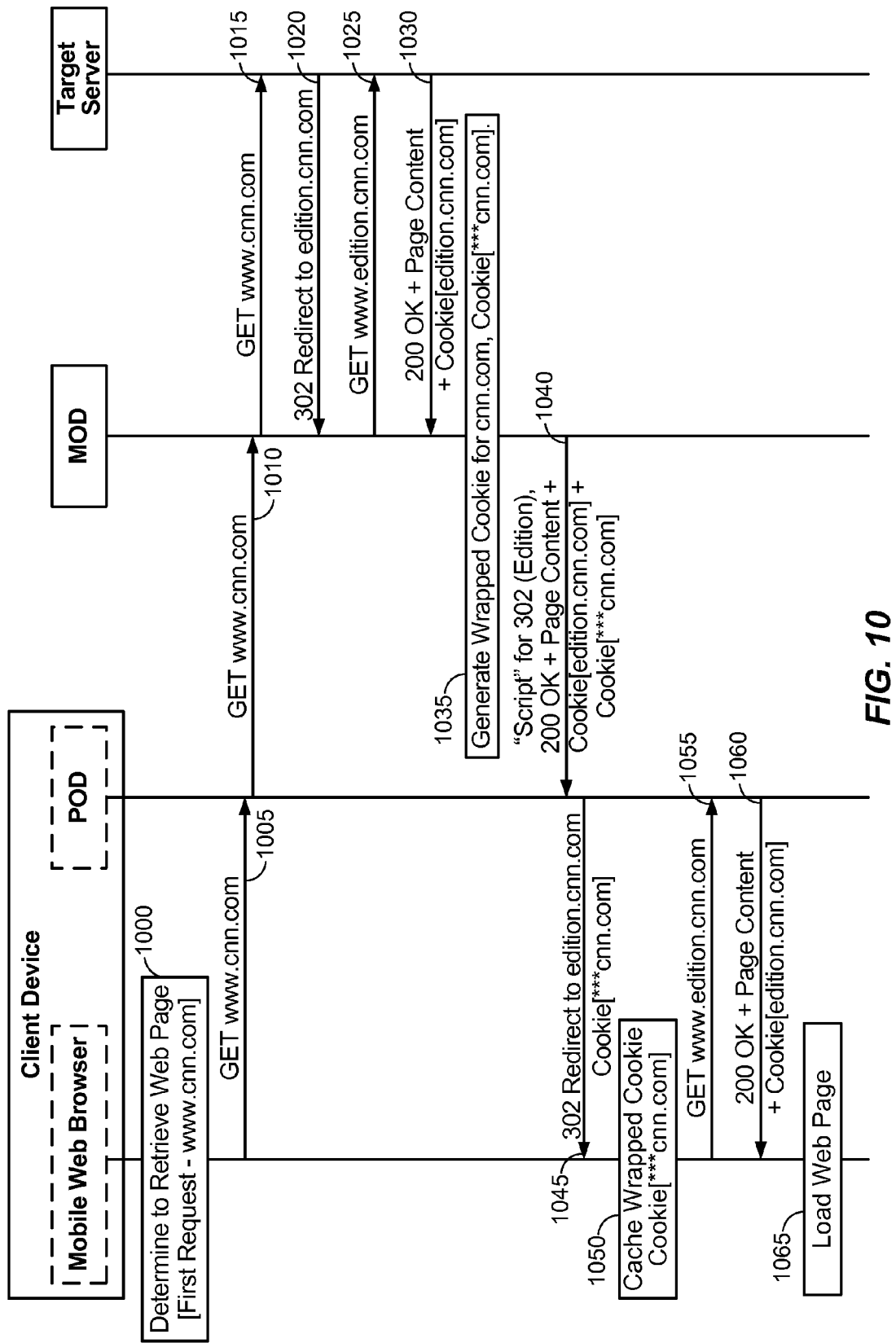
FIGS. 10 and 11 illustrate a modified implementation of the processes of FIGS. 7 and 9, respectively, that permit a proxy server to acquire a cookie for an alternate or redirect web page during a redirect procedure for a second (or later) loading of the alternate web page in accordance with an embodiment of the invention.
Figure 11:
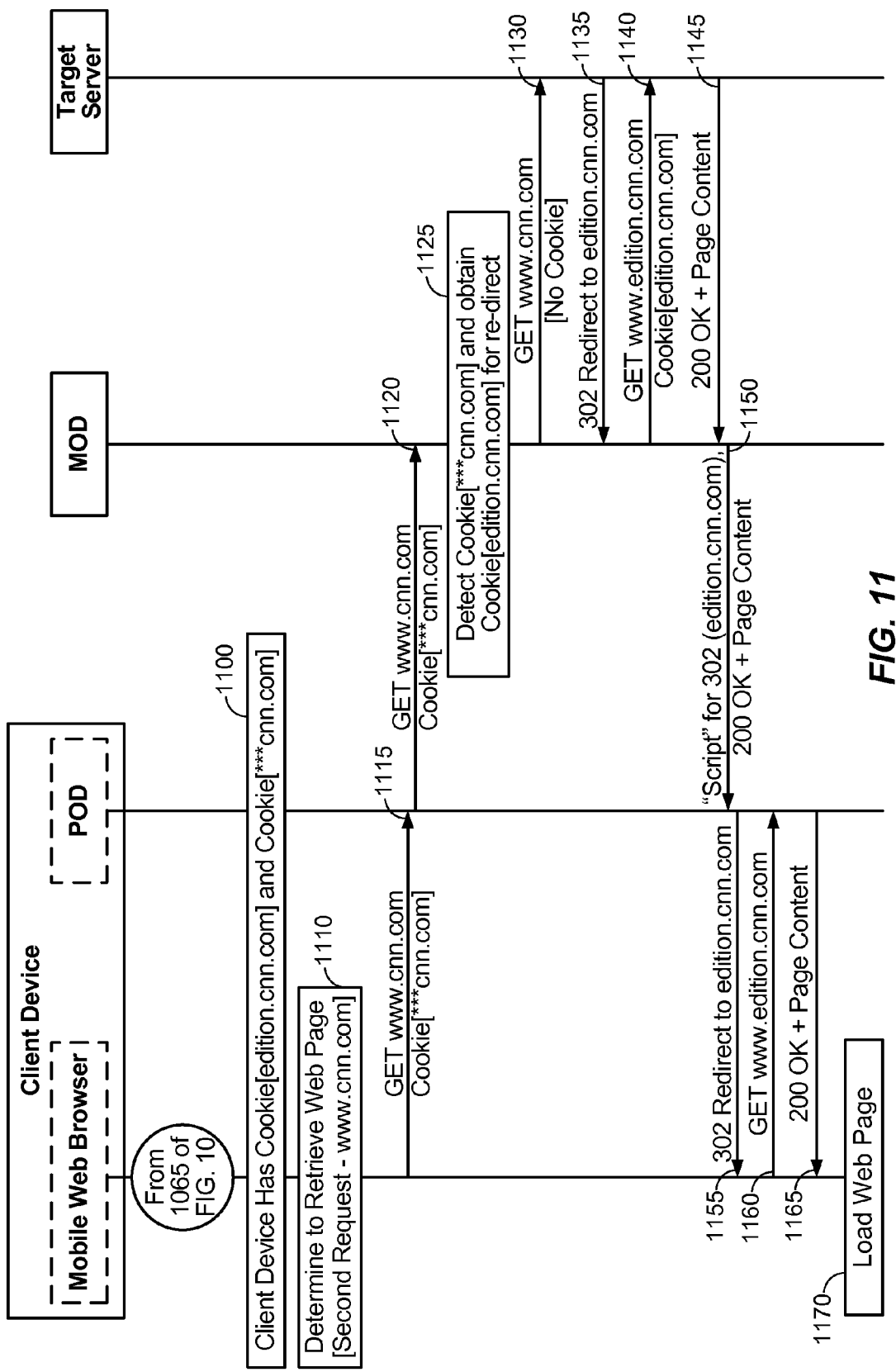

FIGS. 10 and 11 illustrate a modified implementation of the processes of FIGS. 7 and 9 that permit the MOD 225 to acquire the cookie for the alternate web page during a redirect procedure for a second (or later) loading of the alternate web page in accordance with an embodiment of the invention.

Referring to FIG. 10, 1000 through 1030 correspond to 700 through 730 of FIG. 7, and will thereby not be described further for the sake of brevity. At 1035, the MOD 225 generates a "wrapped" cookie for the given web page (e.g., Cookie[***cnn.com]). The wrapped cookie generated at 1035 is not an actual cookie provided from the web server hosting the given web page, but is rather a fake cookie that will be used by the MOD 225 to be able to identify the cookie for the alternate web page. Thus, the MOD 225 maintains access to a function or algorithm that can be applied to the wrapped cookies to unwrap (or reconstruct) the original cookies. In an example, the wrapped cookie may be generated at the MOD 225 by applying base64 to the cookie for the alternate web page, and the wrapped cookie may later be unwrapped (see 1125 of FIG. 11) to reconstruct the cookie for the alternate web page. In a further example, the wrapped cookie may be generated at the MOD 225 by applying a cryptographic function or algorithm (e.g., which may be based upon base64 in one implementation) to the cookie for the alternate web page, and the wrapped cookie may later be unwrapped (see 1125 of FIG. 11) by applying a decryption function or algorithm to reconstruct the cookie for the alternate web page At 1040, the MOD 225 forwards the 200 OK message, the requested content for the alternate web page, the cookie for the alternate web page to the POD 215, and the wrapped cookie along with a set of instructions (or a "Script") for mimicking the 302 redirect procedure for the alternate web page on the client device. 1040 is similar to 735 of FIG. 7 except that the transmission of 1040 further includes the wrapped cookie, which is configured to be interpreted as the cookie for the given web page (i.e., the initially requested web page or www.cnn.com, and not the alternate web page or www.edition.cnn.com) by the mobile web browser.

Referring to FIG. 10, the POD 215 receives the transmission of 1040 and implements the "spoofed" redirect procedure by sending a 302 redirect message for the alternate web page to the mobile web browser, 1045. However, the 302 redirect message of 1045 further includes the wrapped cookie as if the wrapped cookie were the cookie for the given web page. Thus, the inclusion of the wrapped cookie within the 302 redirect message of 1045 causes the 302 redirect message received by the mobile web browser to be different from the 302 redirect message received at the MOD 225 from the web server at 1020.

The mobile web browser caches the wrapped cookie for the given web page, 1050. The mobile web browser also responds to the 302 redirect message with a request for the alternate web page, 1055, the request for the alternate web page is intercepted by the POD 215 and the POD 215 responds to the request with the 200 OK message, the requested content for the alternate web page, and the cookie for the alternate web page to the POD 215, 1060. At this point, the mobile web browser loads the web page with the understanding that it has been redirected to the alternate web page, 1065.

Referring to FIG. 10, after 1065 of FIG. 10, assume that the mobile web browser on the client device has a cookie for the alternate web page (e.g., Cookie[edition.cnn.com] and also the wrapped cookie (e.g., Cookie[***cnn.com]) which the mobile web browser interprets as the cookie for the given web page, 1100. With these assumptions, if the mobile web browser determines to request the given web page again, 1110, the mobile browser attempts to request the given web page at 1115 while providing the wrapped cookie as the cookie for the given web page in its request. The POD 215 intercepts the attempted request and transmits the request to the MOD 225 with the wrapped cookie, 1120. The MOD 225 detects the wrapped cookie and uses the wrapped cookie to look-up the cookie for the alternate web page, 1125 (e.g., by applying an algorithm or function, such as a function based upon base64, to the wrapped cookie to derive or reconstruct the cookie for the alternate webpage). As noted above, the algorithm or function used to reconstruct or "unwrap" the cookie may be a decryption function that reverses encryption that was previously applied to the cookie during the initial wrapping procedure.

The MOD 225 forwards the request for the given web page to the target server associated with the given web page, 1130 (without the wrapped cookie, because the wrapped cookie would not be recognized by the target server). The target server responds to the request with a 302 redirect to an alternate web page, 1135, such as a mobile version of the given web page (e.g., www.edition.cnn.com). At this point, the MOD 225 knows the cookie for the alternate web page based on the look-up operation from 1125. Accordingly, the MOD 225 requests the alternate web page from the associated target server while providing the cookie for the alternate web page (e.g., Cookie[edition.cnn.com]). While not shown explicitly in FIG. 11, providing the cookie with the request of 1140 permits, among other things, page content for the alternate web page to be loaded in a selective manner for the client device. Accordingly, the target server responds to the MOD's request for the alternate web page with a 200 OK message and the requested content for the alternate web page, 1145. At this point 1150 through 1170 of FIG. 11 substantially correspond to 945 through 965 (except that inclusion of the cookie for the alternate web page is optional because the target server was provided this cookie and thereby knows that the requesting client device already has the cookie), and as such will not be described further for the sake of brevity.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a proxy server, comprising:
   receiving a request for an initial web page from a client device;
   requesting the initial web page on behalf of the client device in response to the client device's request;
   executing a web page redirection procedure at the proxy server that is independent of interaction with the client device and includes (i) receiving a redirect message that redirects from the initial web page to an alternative web page, (ii) requesting the alternative web page from a server based on the redirect message, and (iii) receiving web page content from the server that is associated with the alternative web page;
   obtaining a redirect cookie from the server for the alternative web page in response to the proxy server's request for the alternative web page;
   generating a wrapped cookie based on the redirect cookie; and
   delivering the wrapped cookie and the web page content associated with the alternative web page to a proxy client application on the client device along with a set of instructions for simulating, on the client device, the web page redirection procedure for the alternative web page between the proxy client application and a mobile web browser on the client device,
   wherein the set of instructions for simulating the web page redirection procedure is configured to instruct the proxy client application to supply the mobile web browser with the wrapped cookie as a given cookie for the initial web page.

2. The method of claim 1, further comprising:
   receiving a supplemental request for the initial web page from the client device, wherein the supplemental request includes the wrapped cookie;

unwrapping the wrapped cookie to produce an unwrapped cookie that corresponds to the redirect cookie for the alternative web page;
requesting the initial web page on behalf of the client device in response to the client device's supplemental request;
executing a supplemental web page redirection procedure at the proxy server that is independent of interaction with the client device and includes (i) receiving a supplemental redirect message that redirects from the initial web page to the alternative web page, (ii) requesting the alternative web page from the server based on the supplemental redirect message, wherein the proxy server's request for the alternative web page is configured to include the unwrapped cookie, and (iii) receiving supplemental web page content from the server that is associated with the alternative web page; and
delivering the supplemental web page content associated with the alternative web page to the proxy client application on the client device along with a set of supplemental instructions for simulating, on the client device, the supplemental web page redirection procedure between the proxy client application and the mobile web browser.

3. The method of claim 1, further comprising:
receiving a supplemental request for the initial web page from the client device, wherein the supplemental request includes the wrapped cookie; and
unwrapping the wrapped cookie to produce the redirect cookie that was received by the proxy server for the alternative web page during the web page redirection procedure.

4. The method of claim 3, further comprising:
supplying the redirect cookie to the server for requesting the alternative web page in conjunction with a supplemental web page redirection procedure.

5. A method of operating a client device configured to execute a proxy client application, comprising:
transmitting a request for an initial web page to a proxy server;
receiving, from the proxy server in response to the transmitted request, data containing (i) web page content associated with an alternative web page that is different than the initial web page, (ii) a set of instructions for simulating a web page redirection procedure for the alternative web page that occurred at the proxy server, and (iii) a wrapped cookie that is based on a redirect cookie for the alternative web page that was received at the proxy server during the web page redirection procedure for the alternative web page that occurred at the proxy server; and
simulating the web page redirection procedure for the alternative web page that occurred at the proxy server in response to the set of instructions by (i) sending a redirect message to a mobile web browser on the client device that identifies the wrapped cookie as a given cookie for the initial web page and that redirects the mobile web browser from the initial web page to the alternative web page, (ii) receiving a request for the alternative web page from the mobile web browser in response to the redirect message, and (iii) delivering, in response to the received request from the mobile web browser, the web page content associated with the alternative web page that was received by the proxy client application from the proxy server in response to the transmitted request.

6. The method of claim 5, further comprising:
transmitting a supplemental request for the initial web page to the proxy server, wherein the transmitted supplemental request includes the wrapped cookie.

7. The method of claim 5, wherein the wrapped cookie is configured to permit reconstruction, by the proxy server, of the redirect cookie.

8. A proxy server, comprising:
processor;
a memory;
logic configured to receive a request for an initial web page from a client device;
logic configured to request the initial web page on behalf of the client device in response to the client device's request;
logic configured to execute a web page redirection procedure at the proxy server that is independent of interaction with the client device and includes (i) receiving a redirect message that redirects from the initial web page to an alternative web page, (ii) requesting the alternative web page from a server based on the redirect message, and (iii) receiving web page content from the server that is associated with the alternative web page;
logic configured to obtain a redirect cookie from the server for the alternative web page in response to the proxy server's request for the alternative web page;
logic configured to generate a wrapped cookie based on the redirect cookie; and
logic configured to deliver the wrapped cookie and the web page content associated with the alternative web page to a proxy client application on the client device along with a set of instructions for simulating, on the client device, the web page redirection procedure for the alternative web page between the proxy client application and a mobile web browser on the client device,
wherein the set of instructions for simulating the web page redirection procedure is configured to instruct the proxy client application to supply the mobile web browser with the wrapped cookie as a given cookie for the initial web page.

9. The proxy server of claim 8, further comprising:
logic configured to receive a supplemental request for the initial web page from the client device, wherein the supplemental request includes the wrapped cookie;
logic configured to unwrap the wrapped cookie to produce an unwrapped cookie that corresponds to the redirect cookie for the alternative web page;
logic configured to request the initial web page on behalf of the client device in response to the client device's supplemental request;
logic configured to execute a supplemental web page redirection procedure at the proxy server that is independent of interaction with the client device and includes (i) receiving a supplemental redirect message that redirects from the initial web page to the alternative web page, (ii) requesting the alternative web page from the server based on the supplemental redirect message, wherein the proxy server's request for the alternative web page is configured to include the unwrapped cookie, and (iii) receiving supplemental web page content from the server that is associated with the alternative web page; and
delivering the supplemental web page content associated with the alternative web page to the proxy client application on the client device along with a set of supplemental instructions for simulating, on the client device, the supplemental web page redirection procedure between the proxy client application and the mobile web browser.

10. The proxy server of claim 8, further comprising:
logic configured to receive a supplemental request for the initial web page from the client device, wherein the supplemental request includes the wrapped cookie; and
logic configured to unwrap the wrapped cookie to produce an unwrapped cookie that corresponds to the redirect cookie.

11. The proxy server of claim 10, further comprising:
logic configured to supply the redirect cookie to the server for requesting the alternative web page in conjunction with a supplemental web page redirection procedure.

12. A client device configured to execute a proxy client application, comprising:
a processor;
a memory;
logic configured to transmit a request for an initial web page to a proxy server;
logic configured to receive, from the proxy server in response to the transmitted request, data containing (i) web page content associated with an alternative web page that is different than the initial web page, and (ii) a set of instructions for simulating a web page redirection procedure for the alternative web page that occurred at the proxy server, and (iii) a wrapped cookie that is based on a redirect cookie for the alternative web page that was received at the proxy server during the web page redirection procedure for the alternative web pare that occurred at the proxy server; and
logic configured to simulate the web page redirection procedure for the alternative web that occurred at the proxy server in response to the set of instructions by (i) sending a redirect message to a mobile web browser on the client device that identifies the wrapped cookie as a given cookie for the initial web page and that redirects the mobile web browser from the initial web page to the alternative web page, (ii) receiving a request for the alternative web page from the mobile web browser in response to the redirect message, and (iii) delivering, in response to the received request from the mobile web browser, the web page content associated with the alternative web page that was received by the proxy client application from the proxy server in response to the transmitted request.

13. The client device of claim 12, further comprising:
logic configured to transmit a supplemental request for the initial web page to the proxy server, wherein the transmitted supplemental request includes the wrapped cookie.

14. The client device of claim 12, wherein the wrapped cookie is configured to permit reconstruction, by the proxy server, of the redirect cookie.

15. A proxy server, comprising:
means for receiving a request for an initial web page from a client device;
means for requesting the initial web page on behalf of the client device in response to the client device's request;
means for executing a web page redirection procedure at the proxy server that is independent of interaction with the client device and includes (i) receiving a redirect message that redirects from the initial web page to an alternative web page, (ii) requesting the alternative web page from a server based on the redirect message, and (iii) receiving web page content from the server that is associated with the alternative web page;
means for obtaining a redirect cookie from the server for the alternative web page in response to the proxy server's request for the alternative web page;
means for generating a wrapped cookie based on the redirect cookie; and
means for delivering the wrapped cookie and the web page content associated with the alternative web page to a proxy client application on the client device along with a set of instructions for simulating, on the client device, the web page redirection procedure for the alternative web page between the proxy client application and a mobile web browser on the client device,
wherein the set of instructions for simulating the web page redirection procedure is configured to instruct the proxy client application to supply the mobile web browser with the wrapped cookie as a given cookie for the initial web page.

16. A client device configured to execute a proxy client application, comprising:
means for transmitting a request for an initial web page to a proxy server;
means for receiving, from the proxy server in response to the transmitted request, data containing (i) web page content associated with an alternative web page that is different than the initial web page, (ii) a set of instructions for simulating a web page redirection procedure for the alternative web page that occurred at the proxy server, and (iii) a wrapped cookie that is based on a redirect cookie for the alternative web page that was received at the proxy server during the web page redirection procedure for the alternative web page that occurred at the proxy server; and
means for simulating the web page redirection procedure for the alternative web page that occurred at the proxy server in response to the set of instructions by (i) sending a redirect message to a mobile web browser on the client device that identifies the wrapped cookie as a given cookie for the initial web page and that redirects the mobile web browser from the initial web page to the alternative web page, (ii) receiving a request for the alternative web page from the mobile web browser in response to the redirect message, and (iii) delivering, in response to the received request from the mobile web browser, the web page content associated with the alternative web page that was received by the proxy client application from the proxy server in response to the transmitted request.

17. A non-transitory computer-readable medium containing instructions stored thereon, which, when executed by a proxy server, cause the proxy server to perform operations, the instructions comprising:
at least one instruction to cause the proxy server to receive a request for an initial web page from a client device;
at least one instruction to cause the proxy server to request the initial web page on behalf of the client device in response to the client device's request;
at least one instruction to cause the proxy server to execute a web page redirection procedure at the proxy server that is independent of interaction with the client device and includes (i) receiving a redirect message that redirects from the initial web page to an alternative web page, (ii) requesting the alternative web page from a server based on the redirect message, and (iii) receiving web page content from the server that is associated with the alternative web page;

at least one instruction to cause the proxy server to obtain a redirect cookie from the server for the alternative web page in response to the proxy server's request for the alternative web page;

at least one instruction to cause the proxy server to generate a wrapped cookie based on the redirect cookie; and at least one instruction to cause the proxy server to deliver the web page content associated with the alternative web page to a proxy client application on the client device along with a set of instructions for simulating, on the client device, the web page redirection procedure for the alternative web page between the proxy client application and a mobile web browser on the client device, wherein the set of instructions for simulating the web page redirection procedure is configured to instruct the proxy client application to supply the mobile web browser with the wrapped cookie as a given cookie for the initial web page.

18. A non-transitory computer-readable medium containing instructions stored thereon, which, when executed by a client device configured to execute a proxy client application, cause the client device to perform operations, the instructions comprising:

at least one instruction to cause the client device to transmit a request for an initial web page to a proxy server;

at least one instruction to cause the client device to receive, from the proxy server in response to the transmitted request, data containing (i) web page content associated with an alternative web page that is different than the initial web page, (ii) a set of instructions for simulating a web page redirection procedure for the alternative web page that occurred at the proxy server, and (iii) a wrapped cookie that is based on a redirect cookie for the alternative web page that was received at the proxy server during the web page redirection procedure for the alternative web page that occurred at the proxy server; and at least one instruction to cause the client device to simulate the web page redirection procedure for the alternative web page that occurred at the proxy server in response to the set of instructions by (i) sending a redirect message to a mobile web browser on the client device that identifies the wrapped cookie as a given cookie for the initial web page and that redirects the mobile web browser from the initial web page to the alternative web page, (ii) receiving a request for the alternative web page from the mobile web browser in response to the redirect message, and (iii) delivering, in response to the received request from the mobile web browser, the web page content associated with the alternative web page that was received by the proxy client application from the proxy server in response to the transmitted request.

* * * * *